United States Patent [19]
Park et al.

[11] Patent Number: 5,865,960
[45] Date of Patent: Feb. 2, 1999

[54] PHOTOCATALYST, METHOD FOR PREPARING THE SAME, AND PRODUCTION OF HYDROGEN USING THE SAME

[75] Inventors: Dae Chul Park, Yusung-ku; Kyeong Hwan Chung, Kwangsan-ku; Duck Rye Chang, Puk-ku, all of Rep. of Korea

[73] Assignee: Korea Research Institute of Chemical Technology, Daejon, Rep. of Korea

[21] Appl. No.: 793,354

[22] PCT Filed: Aug. 29, 1995

[86] PCT No.: PCT/KR95/00110

§ 371 Date: Feb. 24, 1997

§ 102(e) Date: Feb. 24, 1997

[87] PCT Pub. No.: WO96/06675

PCT Pub. Date: Mar. 7, 1996

[30] Foreign Application Priority Data

Aug. 30, 1994 [KR] Rep. of Korea .................. 1994 21541

[51] Int. Cl.⁶ .............................. C01B 3/00; B01J 23/02; B01J 23/16
[52] U.S. Cl. ...................... 204/157.52; 502/344; 502/353
[58] Field of Search ....................... 204/157.52; 502/344, 502/353

[56] References Cited

U.S. PATENT DOCUMENTS 3,615,216  10/1971  Aldridge ................................. 502/344
5,262,023  11/1993  Sayama et al. .................... 204/157.52

FOREIGN PATENT DOCUMENTS 61-197033  9/1986  Japan .
62-074452  4/1987  Japan .
62-74452   4/1987  Japan .
62-191045  8/1987  Japan .
63-107815  5/1988  Japan .
1-208301   8/1989  Japan .

*Primary Examiner*—Kathryn Gorgos
*Assistant Examiner*—Edna Wang
*Attorney, Agent, or Firm*—Jacobson, Price, Holman & Stern, PLLC

[57] ABSTRACT

A photocatalyst for the preparation of hydrogen consisting of a catalytically active ingredient, cesium (Cs), impregnated in a support, $K_4Nb_6O_{17}$, represented by Formula I as follows:

$$Cs_{(a)}/K_4Nb_6O_{17}$$

wherein a is an amount of the catalytically active ingredient impregnated in the support and has a value of between 0.05 to 5.0% by weight based on total weight of the support. Such a catalyst is prepared by combining $K_2CO_3$ with $Nb_2O_5$ in a mole ratio of 2:3; sintering the combination at a temperature of about 1,200°–1,300° C. to produce the support, $K_4Nb_6O_{17}$; and impregnating the support with the catalytically active ingredient, Cs. Hydrogen is efficiently produced by illuminating an ultraviolet light on an aqueous solution added with an oxygen-containing organic promoter at a reaction temperature of about 15°–80° C., under a reaction pressure of about 0.1–3.0 atm, in the presence of the photocatalyst.

8 Claims, No Drawings

PHOTOCATALYST, METHOD FOR PREPARING THE SAME, AND PRODUCTION OF HYDROGEN USING THE SAME

This is a national stage application of PCT/KR95/00110 filed Aug. 29, 1995.

BACKGROUND OF THE INVENTION

1. Field of the Invention

The present invention relates to a novel photocatalyst useful for a photoreaction in which hydrogen is produced from water and to a method for the preparation of the same.

Also, the present invention is concerned with production of hydrogen with the photocatalyst in combination with a promoter.

2. Description of the Prior Art

Hydrogen is an industrially very useful material over a wide range. For example, synthesis of ammonia and production of hydrogen chloride require hydrogen. It is essential for hydrogenation reactions for the conversion of unsaturated compounds into saturated compounds. In addition, hydrogen is used in the hydrotreating processes, such as hydrogen addition, desulfurization, denitrogenation and demetallization, with the aim of improving the quality of petroleum products. Hydrogen is also ecologically useful. For example, carbon dioxide, a compound which causes the warming of the globe, can be reused by application of the contact hydrogenation of carbon dioxide for which hydrogen is indispensable. Further, hydrogen occupies a powerful position of a pollution-free energy source, substituting the existing fossil fuels.

Many methods have conventionally been undertaken in order to obtain hydrogen, for example, acquirement from fossil fuels, modification of natural gases, reaction of iron with steam, reaction of water with metals, electrolysis of water and etc. Such conventional methods, however, are uneconomical because an enormous quantity of thermal or electric energy is consumed. In addition, oxygen and carbon oxide, the by-products, are produced in large quantities, giving rise to a danger of explosion as well as pollution of environment. Further, the conventional methods are generally poor in production yield and purity of the product. The complexity of process in above-mentioned methods gives another disadvantage. The production of hydrogen by the conventional techniques is carried out at relatively high temperatures, which requires thermal-resistant and thus very expensive gas furnaces and facilities. Accordingly, such high expenditure of facility investment is an obstacle in industrializing the techniques.

Most hydrogen is in a form of water or inorganic substance. Hydrogen gas easily frees itself from the gravity field due to its low mass and thus is present in a very small amount in the air. It is therefore very important to develop a technology for preparing hydrogen from water in high purity and efficiency, in a view of solving the urgent problem of substitute energy source and securing the material of chemical industry.

As efficient techniques for preparing hydrogen from water, there are photoreactions of water using photocatalysts, which have recently been developed. Not much of prior techniques concerning photocatalyst for preparing hydrogen are known.

Japanese Patent Publication Laid-Open No. Sho. 62-191045 discloses that hydrogen is generated by the photolysis of a $Na_2S$ aqueous solution in the presence of a photocatalyst of rare-earth element compound. This photocatalyst is advantageous in its catalytic activity with visible ray.

Japanese Patent Publication Laid-Open No. Sho. 63-107815 uses a composite oxide of niobium and alkali metal as a photocatalyst. Hydrogen is produced by a photolytic reaction in methanol aqueous solution in the presence of the photocatalyst. There is also an advantage that the catalyst is active to visible ray. However, the above-cited patents are disadvantageous in that the amounts of hydrogen generated are very small.

Japanese Patent Laid-Open Publication No. Hei. 1-208301 reveals an advantage of high efficiency for hydrogen generation by thermal-reacting water with aluminum. However, a large quantity of thermal energy is consumed as the thermal reaction occurs at high temperatures of more than 600° C.

SUMMARY OF THE INVENTION

It is therefore a principal object of the present invention is to provide a novel photocatalyst capable of producing hydrogen from water in very high efficiency.

It is another object of the present invention is to provide a novel photocatalyst capable of producing hydrogen from water without consuming large energy.

It is a further object of the present invention is to provide a method for preparing the novel photocatalyst.

It is still another object of the present invention is to provide the production of hydrogen by use of a combination of the photocatalyst and a promoter.

Based on the intensive and through research and study by the present invention, the above objects could be accomplished by providing a photocatalyst for the preparation of hydrogen consisting of a catalytically active ingredient cesium (Cs) impregnated in a support $K_4Nb_6O_{17}$, represented by the following Formula I $$Cs(a)/K_4Nb_6O_{17} \qquad [I]$$

Wherein a in parenthesis denotes the amount of the catalytically active ingredient Cs impregnated in the support $K_4Nb_6O_{17}$ and has a value of 0.05 to 5.0% by weight based on the total weight of the support.

In another aspect of the present invention, there is provided a method for preparing the photocatalyst represented by Formula I, comprising the steps of: combining $K_2CO_3$ with $Nb_2O_5$ in a mole ratio of 2:3 of $K_2CO_3$: $Nb_2O_5$; sintering the combination at a temperature of about 1,200° to 1,300° C., to give $K_4Nb_6O_{17}$, a support; and impregnating the support with a catalytically active inorganic ingredient Cs.

In accordance with a further aspect of the present invention, there is provided a method for the production of hydrogen, comprising illumination of an ultraviolet light on an aqueous solution added with an oxygen-containing organic promoter at a reaction temperature of about 15° to 80° C. under a reaction pressure of about 0.1 to 3 atm, in the presence of the photocatalyst.

These and other objects and advantages of the present invention will be more apparent as following description proceeds.

DETAILED DESCRIPTION OF THE INVENTION $K_4Nb_6O_{17}$, the support for the photocatalyst of the present invention, is prepared by combining potassium carbonate ($K_2CO_3$), an alkali metal compound, with niobium oxide ($Nb_2O_5$), a metal oxide, in a mole ratio of 2:3, pulverizing, pelletizing and then sintering the combination at a temperature of about 1,200° to about 1,300° C. for about 20 minutes. Impregnation of Cs, the catalytically active inorganic ingredient, into the prepared support results in the catalyst of the invention.

For impregnation of the catalytically active ingredient, an aqueous cesium carbonate($CsCO_3$) solution is first prepared, in which the supports are soaked by use of impregnation process. This resultant solution is stirred overnight at room temperature and dried, followed by pulverization into fine powders. Sintering of the fine powders at a temperature of about 100° to about 300° C. for a period of about 1 to about 5 hours gives the photocatalyst of the present invention. For the moment Cs is impregnated preferably in an amount of about 0.05 to about 5.0% by weight and more preferably in an amount of about 0.1 to about 3.0% by weight.

With regard to production of hydrogen with such obtained photocatalyst, it is suspended in an aqueous solution mixed with an oxygen-containing organic promoter and the resulting reaction suspension is exposed to ultraviolet light with stirring in a photoreaction equipment, such as close gas circulatory system. This hydrogen production reaction is carried out at a temperature of about 15° to about 80° C. and more preferably at a temperature of about 15° to about 20° C. For pressure condition, about 0.1 to about 3 atm is adapted and more preferably, the atmospheric pressure.

The oxygen-containing organic promoter used in the present invention is a substance containing aldehyde group, for example, formaldehyde, or alcohol group, for example, methanol. The more the promoter is used, the more is hydrogen produced. From where the amount of the promoter reaches about 5% by volume of the aqueous solution, the production amount of hydrogen rapidly increases. Preferred amount of the promoter is on the order of about 5 to about 30% by volume based on the total volume of the aqueous solution.

In the course of photoreacting in the presence of the photocatalyst, oxygen is generated from the aqueous solution. However, the aldehydes of the promoter are reacted with the oxygen and turned into carboxylic acid. Accordingly, oxygen is not produced in the photoreaction of the present invention.

In the case of the alcohol-containing organic promoter, the alcohols are changed into aldehydes or lower alcohols as a result of reaction with oxygen.

The preferred embodiment of the present invention will now be further described with reference to the following specific examples. In the following Examples, hydrogen production rate is defined as follows:

$$\text{Hydrogen production rate} = \frac{\text{number of moles of hydrogen produced}}{\text{reaction time}}$$

PREPARATION EXAMPLE 1

Preparation of the Support 0.06 mole of potassium carbonate (8.30 g) and 0.09 mole of niobium oxide (23.92 g) were mixed. Following pulverization in agate mortar, the mixture in a platinum crucible was sintered at a temperature of about 1,200° to about 1,300° C. for about 20 minutes, to obtain a $K_4Nb_6O_{17}$ support with a lamellar structure.

PREPARATION EXAMPLES 2 THROUGH 4

Preparation of the Photocatalyst

Predetermined amounts of cesium carbonate were each dissolved in 10 ml of secondary distilled water. The resulting solutions were mixed with 5.0 g of the support prepared in Preparation Example 1, stirred overnight at room temperature, distilled in vacuo, and subjected to sinter at about 200° C. for about 3 hours, to yield $Cs(a)/KNb_6O_{17}$ photocatalysts.

In the photocatalysts, a in parenthesis denotes weight percentage of Cs impregnated and had a value of 0.1, 0.3, and 1.0 each.

EXAMPLES 1 THROUGH 3

Predetermined amounts of formaldehydes were dissolved in secondary distilled water, to prepare 5 vol. %, 10 vol. % and 20 vol. % formaldehyde aqueous solutions. In each 500 ml of these solutions 1 g of the photocatalyst (impregnation amount of metal: 0.1 wt. %) prepared in Preparation Example 2 was suspended. The suspension was poured in a photoreaction equipment of close gas circulatory system, stirred at 400 rpm and illuminated with ultraviolet light from a high pressure mercury lamp.

The amounts of hydrogen and oxygen generated were analyzed by gas chromatography and the results are given in the following Table 1.

Before the photoreaction, the air preexisting in the photoreaction equipment of close gas circulatory system was absolutely removed by a vacuum system and then was nitrogen of 0.2 atm as a circulating gas charged therein.

For the moment cooling water was circulated around the photoreaction equipment, to prevent temperature in the interior of the photoreaction equipment from being increased by the U.V. light.

In this Example, the temperature was maintained at 15° to 20° C.

TABLE 1

Hydrogen and Oxygen production rates in Photolysis of Formaldehyde aqueous Solution in the presence of the Photocatalyst

| Exam. No. | Concentration of Promoter Sol'n | Gas Production Rate ($\mu$mol/hr) | |
|---|---|---|---|
| | | Hydrogen | Oxygen |
| 1 | 5% | 19141.7 | None |
| 2 | 10% | 33278.9 | None |
| 3 | 20% | 37445.0 | None |

EXAMPLE 4

Example 1 was repeated using a reactant which was prepared by suspending 1 g of the photocatalyst prepared in Preparation Example 2 (impregnation amount of metal: 0.1 wt. %) in 500 ml of a second distilled water containing 10 vol. % acetaldehyde. Gas chromatography analysis for hydrogen and oxygen was performed and its results are given as shown in Table 2.

TABLE 2

Hydrogen and Oxygen production rates in Photolysis of Acetaldehyde aqueous Solution in the presence of the Photocatalyst

| Exam. No. | Concentration of Promoter Sol'n | Gas Production Rate (μmol/hr) | |
|---|---|---|---|
| | | Hydrogen | Oxygen |
| 4 | 10% | 7532.7 | None |

EXAMPLE 5

Example 1 was repeated using 1 g of the photocatalyst prepared in Preparation Example 2 (impregnation amount of metal: 0.1 wt. %) and 500 ml of 10 vol. % methanol aqueous solution prepared by dissolving methanol in a second distilled water as a suspension. Gas chromatography analysis for hydrogen and oxygen was performed and its results are given as shown in Table 3.

TABLE 3

Hydrogen and Oxygen production rates in Photolysis of Methanol aqueous Solution in the presence of the Photocatalyst

| Exam. No. | Concentration of Promoter Sol'n | Gas Production Rate (μmol/hr) | |
|---|---|---|---|
| | | Hydrogen | Oxygen |
| 5 | 10% | 6868.9 | None |

EXAMPLE 6

Example 1 was repeated using a reactant which was prepared by suspending 1 g of the photocatalyst prepared in Preparation Example 2 (impregnation amount of metal: 0.1 wt. %) in 500 ml of a secondary distilled water containing 10 vol. % ethanol. Gas chromatography analysis for oxygen and hydrogen was performed and its results are given as shown in Table 4.

TABLE 4

Hydrogen and Oxygen production rates in Photolysis of Ethanol aqueous Solution in the presence of the Photocatalyst

| Exam. No. | Concentration of Promoter Sol'n | Gas Production Rate (μmol/hr) | |
|---|---|---|---|
| | | Hydrogen | Oxygen |
| 6 | 10% | 10642.7 | None |

EXAMPLE 7

Example 1 was repeated using a reactant which was prepared by suspending 1 g of the photocatalyst prepared in Preparation Example 2 (impregnation amount of metal: 0.1 wt. %) in 500 ml of a secondary distilled water containing 10 vol. % propanol. Gas chromatography analysis for hydrogen and oxygen was performed and its results are given as shown in Table 5.

TABLE 5

Hydrogen and Oxygen production rates in Photolysis of Propanol aqueous Solution in the presence of the Photocatalyst

| Exam. No. | Concentration of Promoter Sol'n | Gas Production Rate (μmol/hr) | |
|---|---|---|---|
| | | Hydrogen | Oxygen |
| 7 | 10% | 33278.9 | None |

COMPARATIVE EXAMPLES 1 THROUGH 3

Example 1 was repeated using reactants which were prepared by suspending 1 g of the respective photocatalysts prepared in Preparation Examples 2, 3 and 4 impregnation amount of metal: 0.1 wt. %, 0.3 wt. %, and 1.0 wt. %) in a secondary distilled water. Gas chromatography analysis for hydrogen and oxygen was performed and its results are given as shown in Table 6.

TABLE 6

Hydrogen and Oxygen production rates in Photolysis of Water in the presence of the Photocatalyst

| Exam. No. | (wt. %) Amount of Metal impregnated | Gas Production Rate (μmol/hr) | |
|---|---|---|---|
| | | Hydrogen | Oxygen |
| C. 1 | 0.1% | 1474.0 | 6.2 |
| C. 2 | 0.3% | 1180.9 | 2.1 |
| C. 3 | 1.0% | 370.6 | 0.4 |

COMPARATIVE EXAMPLE 4

Example 1 was repeated using 500 ml of a secondary distilled water containing 10 vol. % aldehyde as a reactant in the absence of the photocatalyst. Gas chromatography analysis for hydrogen and oxygen was performed and its results are given as shown in Table 7.

TABLE 7

Hydrogen and Oxygen production rates in Photolysis of Formaldehyde aqueous Solution in the absence of the Photocatalyst

| Exam. No. | Concentration of Promoter Sol'n | Gas Production Rate (μmol/hr) | |
|---|---|---|---|
| | | Hydrogen | Oxygen |
| C. 4 | 10% | 4818.6 | None |

COMPARATIVE EXAMPLE 6

Example 1 was repeated using a reactant which was prepared by suspending 1 g of the photocatalysts prepared in Preparation Example 2 (impregnation amount of metal: 0.1 wt. %) in 500 ml of a secondary distilled water containing 10 vol. % formic acid. Gas chromatography analysis for hydrogen and oxygen was performed and its results are given as shown in Table 8.

TABLE 8

Hydrogen and Oxygen production rates in Photolysis of Formic acid aqueous Solution in the presence of the Photocatalyst

| Exam. No. | Concentration of Promoter Sol'n | Gas Production Rate (μmol/hr) | |
| --- | --- | --- | --- |
| | | Hydrogen | Oxygen |
| C. 5 | 10% | 3987.7 | 852.5 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for preparing a photocatalyst represented by Formula I as follows:

$$Cs(a)/K_4Nb_6O_{17}$$

wherein a is an amount of catalytically active ingredient, Cs, impregnated in the support $K_4Nb_6O_{17}$, comprising the steps of:
   combining $K_2CO_3$ with $Nb_2O_5$ in a mole ratio of 2:3;
   sintering the combination at a temperature of about 1,200°–1,300° C. to produce the support, $K_4Nb_6O_{17}$; and
   impregnating the support with the catalytically active ingredient, Cs.

2. The method of claim 1, wherein the impregnating step is accomplished by mixing the support in a $Cs_2CO_3$ aqueous solution, stirring the mixture overnight at room temperature, distilling the mixture in vacuo to obtain a dried mixture and sintering the dried mixture at a temperature of about 100°–300° C., for a period of about 1–5 hours.

3. A method for producing hydrogen, comprising the steps of:
   illuminating an ultraviolet light on an aqueous solution comprising an oxygen-containing organic promoter, at a reaction temperature of about 15°–80° C., under a reaction pressure of about 0.1–3.0 atm, in contact with a photocatalyst according to claim 1; and
   generating hydrogen; wherein the oxygen-containing organic promoter is a compound containing an aldehyde group.

4. The method of claim 3, wherein the reaction pressure is atmospheric pressure.

5. The method of claim 3, wherein the oxygen-containing organic promoter is a compound containing an alcohol group.

6. The method of claim 3, wherein the oxygen-containing organic promoter is added in an amount of about 5–30% by volume based on total volume of the aqueous solution.

7. The method of claim 1, wherein a has a value of between 0.05 to 5.0% by weight, based on the total weight of the support.

8. The method of claim 1, wherein the catalytically active ingredient is impregnated in an amount between 0.1–3.0 wt %.

* * * * *